(12) United States Patent
Zwiener et al.

(10) Patent No.: US 11,720,124 B2
(45) Date of Patent: Aug. 8, 2023

(54) METHOD OF CONTROLLING AN ACTUATOR SYSTEM AND AIRCRAFT USING SAID METHOD

(71) Applicant: Volocopter GmbH, Buchsal (DE)

(72) Inventors: Jan Zwiener, Waldbronn (DE); Burak Yuksel, Heidelberg (DE)

(73) Assignee: Volocopter GmbH, Bruchsal (DE)

( * ) Notice: Subject to any disclaimer, the term of this patent is extended or adjusted under 35 U.S.C. 154(b) by 293 days.

(21) Appl. No.: 16/943,414

(22) Filed: Jul. 30, 2020

(65) Prior Publication Data

US 2021/0072771 A1    Mar. 11, 2021

(30) Foreign Application Priority Data

Sep. 10, 2019    (EP) .................................... 19196435

(51) Int. Cl.
  *G05D 1/10*    (2006.01)
  *B64C 27/08*    (2023.01)
  (Continued)

(52) U.S. Cl.
  CPC ............. *G05D 1/102* (2013.01); *B64C 27/08* (2013.01); *B64C 39/024* (2013.01);
  (Continued)

(58) Field of Classification Search
  None
  See application file for complete search history.

(56) References Cited

U.S. PATENT DOCUMENTS

| 9,115,662 B1 | 8/2015 | Claggett et al. |
| 2003/0002686 A1 | 1/2003 | Millott et al. |

(Continued)

FOREIGN PATENT DOCUMENTS

DE    102010040770    3/2012

OTHER PUBLICATIONS

Machine Translation of DE102010040770 (provided in IDS) (Year: 2022).*

*Primary Examiner* — Isaac G Smith
*Assistant Examiner* — Jennifer M Anda
(74) *Attorney, Agent, or Firm* — Volpe Koenig

(57) ABSTRACT

A method of controlling an actuator system including a plurality of k actuators. Each of the actuators-receives a control input $u_i$, wherein index i denotes a particular actuator, which control input $u_i$ is determined depending on a weight matrix W including a weighting factor $w_i$ for each actuator and depending on at least a physical maximum control limit $u_i^{max}$ for each of the actuators. The weighting factors $w_i$ and/or physical maximum control limit $u_i^{max}$ are actively changed during operation if a first comparison of the control input $u_i$ or a function $f(u_i)$ thereof with a set first threshold value yields that the control input $u_i$ or function $f(u_i)$ thereof exceeds the set first threshold value. The first comparison is repeated during operation, and a new control input $u_i$ is determined from the adjusted weighting factor $w_i$ and/or the adjusted physical maximum control limit $u_i^{max}$ and applied to the actuators.

15 Claims, 4 Drawing Sheets

(51) Int. Cl.
*B64C 39/02* (2023.01)
*B64U 30/20* (2023.01)
*G05D 1/00* (2006.01)

(52) U.S. Cl.
CPC ........... *G05D 1/0072* (2013.01); *B64U 30/20* (2023.01); *B64U 2201/00* (2023.01)

(56) References Cited

U.S. PATENT DOCUMENTS

| | | |
|---|---|---|
| 2012/0221156 A1 | 8/2012 | Fuller et al. |
| 2017/0152033 A1 | 6/2017 | Allen |
| 2019/0202546 A1* | 7/2019 | Mahboubi .............. G05D 1/102 |
| 2020/0103922 A1* | 4/2020 | Nonami ................ G05D 1/0072 |
| 2020/0241567 A1* | 7/2020 | Zwiener ................ B64D 31/04 |
| 2021/0107626 A1* | 4/2021 | Yuksel ................ G05D 1/0858 |
| 2021/0163144 A1* | 6/2021 | Yuksel ................ G05D 1/0858 |

* cited by examiner

Algorithm 1 Weighting and Reshaping Algorithm

1: procedure INITIALIZE
2:     for $i \leftarrow 1, n$ do     ▷ Init. each cool-down for each propulsion unit $i$.
3:         $t_i^{cd} \leftarrow t_i^{cd,init}$     ▷ Perform once in the initialization.
4:         $u_i^{max} \leftarrow u_i^{max,init}$
5: procedure REWEIGHTRESHAPEALLOCATION
6:     for $i \leftarrow 1, n$ do     ▷ For each propulsion unit $i$.
7:         if $f_i(\mathbf{u}_i) \geq f_i(u_i^{min})$ and $f_i(\mathbf{u}_i) \leq f_i(u_i^{avail})$ and $t_i^{cd} = t_i^{cd,init}$ then
8:             $w_i \leftarrow 1$     ▷ Nominal cond.
9:             $t_i^{avail} \leftarrow t_i^{avail} - dt$
10:            $t_i^{max} \leftarrow t_i^{max} - dt$
11:            if $t_i^{avail} < 0$ then
12:                $t_i^{avail} \leftarrow 0$     ▷ Make sure $t_i^{avail}$ is lower-bounded.
13:            if $t_i^{max} < 0$ then
14:                $t_i^{max} \leftarrow 0$     ▷ Make sure $t_i^{max}$ is lower-bounded.
15:         if $f_i(\mathbf{u}_i) > f_i(u_i^{avail})$ then
16:             $t_i^{avail} \leftarrow t_i^{avail} + dt$
17:         if $f_i(\mathbf{u}_i) > f_i(u_i^{max}) - \epsilon_i$ then
18:             $t_{max} \leftarrow t_{max} + dt$
19:         if $t_i^{avail} = 0$ and $t_i^{max} = 0$ then     ▷ Nominal cond.
20:             $w_i \leftarrow 1$
21:         else
22:             if $(t_i^{max} \geq \bar{t}_i^{max})$ or $(t_i^{avail} \geq \bar{t}_i^{avail})$ then     ▷ Actuator is in hard limits
23:                 $w_i \leftarrow 1$
24:                 $u_i^{max} \leftarrow u_i^{avail}$     ▷ $u_i^{avail}$ is new maximum (re-shape)
25:                 $t_i^{cd} \leftarrow t_i^{cd} - dt$     ▷ Cool-down counter
26:                 if $t_i^{cd} \leq 0$ then     ▷ End of cool-down
27:                     $t_i^{cd} \leftarrow t_i^{cd,init}$
28:                     $t_i^{max} \leftarrow 0$
29:                     $t_i^{avail} \leftarrow 0$
30:                     $u_i^{max} \leftarrow u_i^{max,init}$
31:             else
32:                 if $t_i^{max} \neq 0$ then
33:                     $w_i = wf1(t_i^{max}) \in [0, 1]$
34:                 else if $t_i^{avail} \neq 0$ then     ▷ Actuator is in soft limits
35:                     $w_i = wf2(t_i^{avail}) \in [0, 1]$     ▷ Weight the actuator (re-weight)
36: procedure WEIGHTEDALLOCATION
37:     $\mathbf{D}^{-1} \leftarrow \mathbf{D}^{-1}(\mathbf{W}, \mathbf{u}^{min}, \mathbf{u}^{max})$

Fig. 3

METHOD OF CONTROLLING AN ACTUATOR SYSTEM AND AIRCRAFT USING SAID METHOD

INCORPORATION BY REFERENCE

The following documents are incorporated herein by reference as if fully set forth: European Patent Application No. 19 196 435.2, filed Sep. 10, 2019.

TECHNICAL FIELD

The invention relates to a method of controlling an actuator system comprising a plurality of k actuators, preferably for controlling a multiactuator aerial vehicle, wherein said actuators are preferably devised as individual propulsion units of the multiactuator aerial vehicle.

The invention also relates to an aircraft, in particular electrically propelled VTOL (vertical take-off and landing) aircraft, comprising an actuator system with a plurality of k actuators, wherein said actuators are devised as individual propulsion units of the aircraft.

BACKGROUND

In overly determined actuator systems, e.g. multiactuator aerial vehicles (MAVs), wherein each actuator may be identified as a propulsion unit of the aircraft, there are different possibilities to achieve given tasks, such as a given flight direction. The given task can be allocated in different ways/portions to the different actuators. In other words: each one of the actuators receives a corresponding control signal to control its operation, so that the joint operation of all actuators can achieve said given task (e.g., fly in a desired direction). One way to do this has been described in German application DE 10 2019 101 903, filed by the present applicant.

So far, no allocation method is known from the prior art which considers the actuators' health status/characteristics. Actuators, e.g. electric motors for MAVs, can provide continuous power for a substantially unlimited time, i.e., continuously during a given mission, or in case of emergency or failure scenario until a safe landing of the MAV, whereas if more power is needed, they can provide a peak power, however only for a certain amount of time, before they overheat. This can lead to degradation or loss of motors. In consequence, this can lead to a higher power demand on the remaining motors, which implies further failures of the remaining motors due to an ever increasing overload cascade.

SUMMARY

It is the object of the present invention to provide an allocation method for overly determined actuator systems in the form of a method of controlling an actuator system comprising a plurality of k actuators, which allocates a given task for the overall system to the multiple actuators, considering the actuators characteristics in terms of available physical capacity in a specific timeframe, thus avoiding the above-described degradation and overload situation, in particular in connection with a multiactuator aerial vehicles (MAV).

The object is achieved by a method of controlling an actuator system and by an aircraft (or MAV) having one or more of the features described herein. Advantageous further embodiments are described below and in the claims.

According to the present invention, there is proposed a method of controlling an actuator system comprising a plurality of k actuators, preferably for controlling a multi-actuator aerial vehicle, wherein said actuators are preferably devised as individual propulsion units of the multiactuator aerial vehicle. Each of said actuators, during operation, receives a control input (signal) $u_i$, wherein index i (i=1, . . . , k) denotes a particular (or given) actuator. This control input $u_i$ is determined depending on a weight matrix W comprising a weighting factor $w_i$ for each of the actuators and depending on at least a physical maximum control limit $u_i^{max}$ for each of the actuators. Said weighting factors $w_i$ and/or physical maximum control limits $u_i^{max}$ are actively changed during operation of the actuator system if a first comparison, for at least some of the actuators, of said control input $u_i$ or a function $f_i(u_i)$ thereof with a set first threshold value yields that said control input $u_i$ or said function $f_i(u_i)$ thereof exceeds said set first threshold value, which set first threshold value preferably will be different for each actuator. Said first comparison is repeated over time during operation of the actuator system, preferably at regular time intervals. A new control input $u_i$ is determined from the adjusted weighting factor $w_i$ and/or the adjusted physical maximum control limit $u_i^{max}$ and applied to the actuators, thus considering the actuators' characteristics in terms of available physical capacity in a specific timeframe.

Whenever the present application refers to "applying a new control input $u_i$ which is determined from the adjusted weighting factor $w_i$ and/or the adjusted physical maximum control limit $u_i^{max}$ to the actuators", or the like, it shall be understood that a corresponding control input $u_i$ is applied to a corresponding actuator i, which control input $u_i$ is determined based on weighting factor $w_i$ and/or the adjusted physical maximum control limit $u_i^{max}$ for that actuator.

Further, according to the present invention, there is proposed an aircraft or MAV, in particular an electrically propelled VTOL aircraft (eVTOL), comprising: an actuator system comprising a plurality of k actuators, wherein said actuators are devised as individual propulsion units of the aircraft, wherein each of said actuators, during operation, is adapted to receive, from at least one flight control unit or controller, a control input $u_i$, wherein index i denotes a particular actuator, wherein said control input $u_i$ is determined by at least one computer algorithm performed on said at least one flight control unit, preferably on board the aircraft and/or in real time, wherein the at least one flight control unit, by means of said algorithm, is adapted to perform the method according to the invention and to supply said (new) control input $u_i$ to said actuators (i.e., to each corresponding actuator i).

For simplicity, the quantities $u_i$, $u_i^{max}$, $w_i$ etc. (wherein i=1, . . . , k) will hereinafter alternatively be expressed as $u$, $u^{max}$, $w$, . . . , which are vectors with components $u_i$, $u_i^{max}$, $w_i$, respectively.

The (allocation) method according to the invention can be applied for a wide class of systems, e.g. aircraft, robots, under-actuated and/or overly determined systems, etc. For better understanding, the equations of motion of such systems, which can be derived using the Newton-Euler principle or the Lagrange method are depicted as follows:

$$M(x)\ddot{x}+c(x,\dot{x})+g(x)+G(x)u_p=f_{ext}, \quad \text{(Equation 1)}$$

where $x \in \mathbb{R}^n$ is an n-dimensional configuration vector of the system, e.g. positions and rotations in 3D, $M(x) \in \mathbb{R}^{n \times n}$ is the state dependent generalized moment of inertia, $c(x,\dot{x}) \in \mathbb{R}^n$ is the state dependent Coriolis forces, $g(x) \in \mathbb{R}^n$ stand for the gravitational forces and $f_{ext} \in \mathbb{R}^n$ are the external forces and torques, e.g. due to aerodynamics, physical contact, etc. A pseudo control input $u_p \in \mathbb{R}^m$ can be defined, which is used to control the (actuator) system. This pseudo-control input (which equals a collective thrust and torques acting on the aircraft owing to its actuators (propulsion units) in Multi-actuator Aerial Vehicles) enters into the system dynamics as given by (Equation 1), after modification with a so-called control input matrix $G(x) \in \mathbb{R}^{n \times m}$. This matrix contains the information of, e.g., under-actuation, where the system is said to be under-actuated if Rank $(G(x)) < n$, as known to the skilled person.

Allocation happens between the actual control input $u \in \mathbb{R}^k$, i.e., the input values $u_i$ defined before, and the pseudo control input $u_p \in \mathbb{R}^m$ (vector with components $u_{pj}$ with $j = \{1, \ldots, m\}$) via $$u_p = Du, \quad \text{(Equation 2)}$$

where is defined $D \in \mathbb{R}^{m \times k}$ as allocation matrix.

Note that a system can be both under-actuated and overly determined, i.e., in case of k>m>n or Rank $(G(x)D) < n$.

Using state feedback control laws (which for MAV-VTOL comprise, e.g., attitude, altitude, position/velocity control, path/trajectory tracking etc.) based on the system dynamics described in Equation 1, one can compute a desired $u_p$. This, however, needs to be distributed to the physical actuators using actual control inputs u. Hence, a sort of inverse matrix computation is needed in order to compute u from the desired $u_p$. This is depicted by $$u = D^{-1} u_p. \quad \text{(Equation 3)}$$

In the present context, this inversion is done by considering a weight matrix $W \mathbb{R} \mathbb{R}^{k \times k}$, where generally $W = \text{diag}\{w_1, w_2, \ldots, w_k\}$ (the $w_i$ defined before) and the physical limits of each actuator, e.g. $u^{min} \in \mathbb{R}^k$ and $u^{max} \in \mathbb{R}^k$, can be considered in this inversion. This implies that $$D^{-1} = D^{-1}(W, u^{min}, u^{max}) \in \mathbb{R}^{k \times m} \quad \text{(Equation 4)}$$

wherein it should be recalled that actually $D = D(u_u^{min}, u^{max})$ or at least $D = D(u^{max})$.

Preferably, the aircraft further comprises sensors for providing data representative of a physical and operational state of the aircraft, wherein the least one flight control unit is devised to determine said pseudo control input $u_p$ from said sensor data.

In a corresponding preferred embodiment of the method according to the present invention, said control input $u_i$ can be determined based on a pseudo control input $u_p$, wherein $u_p = Du$, D being an allocation matrix dependent on at least $u_i^{max}$, wherein determining u involves solving an equation $u = D^{-1} u_p$, $D^{-1}$ being defined as $D^{-1}(W, u^{max})$, W being said weight matrix, wherein the inverse allocation matrix $D^{-1}$ is adjusted according to the changed values of W and $u^{max}$; and wherein the new control input $u_i$ is determined from the adjusted inverse allocation matrix $D^{-1}$ and applied to the actuators.

Additionally, $u^{min}$ can be considered as well, which can comprise a lower physical control limit $u_i^{min}$ of each actuator. In that case, $D^{-1}$ could be defined as $$D^{-1} = D^{-1}(W, u^{min}, u^{max})$$

W being said weight matrix, wherein the inverse allocation matrix $D^{-1}$ is adjusted according to the changed values of W, $u^{min}$ and $u^{max}$; and wherein the new control input $u_i$ is determined from the adjusted inverse allocation matrix $D^{-1}$ and applied to the actuators.

The method does actively change W, $u^{min}$, $u^{max}$ or at least W, $u^{max}$ and hence can reshape D and $D^{-1}$, in case one or more actuators of the system is/are close to their physical limits. By doing so, a given actuator can be protected (e.g. from overheating) and ergo the overall system. To achieve this, no feedback data from the actuators to the flight control unit is required, but if available and applicable such data could be used as well. In such case, a feedback from the actuators, e.g. their states (RPM, health status, frequency response, temperature, voltage, current, etc) can be used in order to cross-check if any actuator is in saturation, unhealthy or demanding excessive power levels. This cross-check can improve the quality of detection when the W and $u^{max}$ values shall be changed.

In a preferred embodiment of the method according to the present invention, said first threshold value is defined as a rather soft limit, which is hereinafter referred to as available control limit and denoted $u^{avail}$ $[u_1^{avail}, u_2^{avail}, \ldots u_k^{avail}] \in \mathbb{R}^k$, where $u_i^{avail}$ is the available control limit for the i-th actuator. See appended FIG. 2 as explained below for clarification. For typical actuators, e.g. electric motors for MAVs, this limit corresponds to the characteristics or functional mode described before according to which the actuator can provide continuous power for a substantially unlimited time, at least for the remaining mission duration.

Note that the values $u_i^{avail}$ for each actuator are not necessarily static values, they can also dynamically change e.g. based on actuator temperature, demanded thrust and torques ($u_p$) etc.

Therefore, in a preferred embodiment of the method according to the present invention, said first threshold value comprises an available control limit for each actuator, said available control limit being a control input at which a given actuator can function continuously without overload.

Furthermore, for each actuator, e.g. for the i-th one, one can define $f_i(*)$, which is a function of*, where*=$\{u_i, u_i^{min}, u_i^{max}, u_i^{avail}\}$. These functions, namely $f_i(u_i)$, $f_i(u_i^{min})$, $f_i(u_i^{max})$, $f_i(u_i^{avail})$ can be:
the control values/limits themselves, i.e. $f_i(*) = *$, e.g. $f_i(u_i) = u_i$,
a respective actuator power consumption corresponding to these control values/limits,
any other measurable, observable or controllable value of the actuators.

Preferably, the system under consideration, e.g. the aircraft, comprises sensor means in connection with the actuators, which sensor means are arranged and devised for measuring values corresponding to $f_i(*)$, and to provide said measured values to the flight control unit in order to enable the flight control unit to perform the method in accordance with the present invention.

For an aircraft,
$f_i^{min}(u_i^{min})$ could be the minimum RPM, thrust, torque, power, etc. that a given actuator can provide;
$f_i^{avail}(u_i^{avail})$ could be the maximum RPM, thrust, torque, power, etc. that a given actuator can provide continuously, e.g. without encountering any overheating or overloading problems;
$f_i^{max}(u_i^{max})$ would be the maximum RPM, thrust, torque, power, etc. that a given actuator can physically provide, but only for a specific (limited) amount of time.

These values are known, e.g., from the manufacturer of the actuators, or can be set based on simulations, experiments, experience, etc.

In a preferred embodiment of the method according to the present invention, one can define a timer or counter, denoted $t_i^{cd}$, which represents a cool-down timer for the i-th actuator. Its initial value is denoted $t_i^{cd,init}$, e.g., $t_i^{cd,init} = 10$ s (without limitation). This initial value can also be known before, e.g., from the manufacturer of the actuator, or decided based on simulations, experiments, experience, etc.

In preferred embodiment of the method according to the present invention, one can define other timers (counters) and corresponding time limits (counter thresholds):

$t_i^{max}$: amount of time, e.g. seconds, for which the i-th actuator is close to its maximum physical limits, e.g. $f_i(u_i) \geq f_i^{max} - \in_i$, wherein $\in_i$ can be a small heuristically set number (a safety margin);

$\bar{t}_i^{max}$: upper threshold of $t_i^{max}$, i.e. $t_i^{max}$ is not allowed to be greater than $\bar{t}_i^{max}$.

$t_i^{avail}$: amount of time, e.g. seconds, in which for the i-th actuator $f_i(u_i) > f_i^{avail}$.

$\bar{t}_i^{avail}$: upper threshold of $t_i^{avail}$, i.e. $t_i^{avail}$ is not allowed to be greater than $\bar{t}_i^{avail}$.

In this context, instead of timers or counters ($t_i^{max}$, $t_i^{avail}$) one can use other values as function of time, e.g. temperature, power, etc. In this case, reshaping and reweighting will be done directly by comparing temperature measurements or power computations, if they are available.

In preferred embodiment of the method according to the present invention, a first counter, e.g., $t_i^{avail}$ as defined above, is augmented whenever said first comparison yields that said control input u or said function $f(u)$ thereof exceeds said first set threshold value, e.g., $f_i(u_i^{avail})$, and wherein at least matrix W is adjusted based on a current value of said first counter, preferably based on a weighting function, a value of which weighting function is dependent on said current value of said first counter. Preferably, W is adjusted based on a current value of said first counter only if said first counter does not exceed its threshold (cf. above).

In another preferred embodiment of the method according to the present invention, a second counter, e.g., $t_i^{max}$ as defined above, is augmented whenever a comparison yields that said control input u or said function $f(u)$ thereof exceeds said corresponding set threshold value, e.g., $f_i(u_i^{max}) - \in_i$, and wherein at least matrix W is adjusted based on a current value of said second counter, preferably based on a weighting function, a value of which weighting function is dependent on said current value of said second counter. Preferably, W is adjusted based on a current value of said second counter only if said second counter does not exceed its threshold (cf. above).

For instance, said weighting function can be a sigmoid-like or any other preferably continuous function of said current value of said first counter, e.g., a function defined as "1-sigmoid", said weighting function most preferably ranging between values from 0 to 1, so that a given actuator is either considered fully (1), excluded from allocation (0), or considered with a weight between 0 and 1, depending on a current value of said first counter. This takes into consideration that the actuator in question has been functioning above its "available" limit for some time. Preferably, the value of the weighting function decreases for increasing values of said first or second counter.

In preferred embodiment of the method according to the present invention, the value for $u^{max}$, i.e. $u_i^{max}$ is adjusted to a lower value, i.e, decreased, said lower value preferably being a control input at which a given actuator can function continuously without overload (said "available" limit), if said first counter exceeds a set first counter threshold, e.g., $\bar{t}_i^{avail}$ as defined above. This can also be referred to as a reshaping of matrix D and $D^{-1}$, respectively.

In another preferred embodiment of the method according to the present invention, at least one of Wand $u^{max}$ (optionally also $u^{min}$) is actively changed during operation of the actuator system based on a second comparison, for at least some of the actuators, of the control input u or a function $f(u)$ thereof with at least a second set threshold value, e.g., $f_i^{max}(u_i^{max})$, for said control input u or said function $f(u)$ thereof, if said second comparison yields that said control input u or said function $f(u)$ thereof exceeds said second set threshold value. Furthermore, it is checked if a second counter, e.g. $t_i^{max}$, which second counter is augmented whenever said second comparison yields that said control input u or said function $f(u)$ thereof exceeds said second set threshold value, exceeds a set second counter threshold, e.g., $\bar{t}_i^{max}$, whereupon $u_i^{max}$ is adjusted to a lower value. This lower value preferably is a control input at which a given actuator can function continuously without overload, e.g., $u_i^{avail}$, said second comparison being repeated over time during operation of the actuator system, preferably at regular time intervals. Said second threshold value, e.g., $f_i^{max}(u_i^{max})$ comprises a maximum control limit for each actuator, said maximum control limit being a control input at which a given actuator can function only during a limited amount of time without overload. This takes into account that a given actuator's maximum peak level of performance will be determined by $u_i^{max}$. This, too, be referred to as a reshaping of matrix D and $D^{-1}$, respectively.

In yet another embodiment of the method according to the present invention, said second set threshold value can be lowered by a safety margin. In other words, the above-defined second comparison results in an increase of said second counter if $f_i(u_i) \geq f_i^{max} - \in_i$, wherein $\in_i$ can be a (small) heuristically set number. This shall protect the corresponding actuator from overheating/overloading when functioning at or close to its physical limit.

In another embodiment of the method according to the present invention, if either said first counter exceeds said set first counter threshold (e.g., $t_i^{avail} \geq \bar{t}_i^{avail}$) or said second counter exceeds said set second counter threshold (e.g., $t_i^{max} \geq \bar{t}_i^{max}$) a third counter (e.g., the above-defined cool-down timer) is decreased, and if said third counter has reached a third set counter threshold, which can be zero, said first to third counters are reset to a respective initial value thereof. In this way, after some time during which an actuator has functioned at reduced power, its operating conditions can be set back to normal.

In yet another preferred embodiment of the method according to the present invention, based on a third comparison, for at least some of the actuators, of the control input u or a function $f(u)$ thereof with said first set threshold value and of said third counter with said third set counter threshold, if said third comparison yields that said control input u or said function $f(u)$ thereof does not exceed said first set threshold value, e.g., $f_i(u_i) \leq (u_i^{avail})$, and that said third counter has its initial value, e.g., $t_i^{cd} = t_i^{cd,init}$, then at least $w_i$ is set to a default value, preferably $w_i$ being equal to unity ($w_i = 1$), said third comparison being repeated over time during operation of the actuator system, preferably at regular time intervals. This defines normal operating conditions of the actuator system.

In another embodiment of the method according to the present invention, if said third comparison yields that said control input u or said function $f(u)$ thereof does not exceed said first set threshold value, e.g., $f_i(u_i) \leq f_i(u_i^{avail})$, and that said third counter has its initial value (e.g., $t_i^{cd} = t_i^{cd,init}$), said first counter (e.g., $t_i^{avail}$) is decreased and/or said second counter (e.g., $t_i^{max}$) is decreased. This accounts for normal operation of a given actuator, which may have an effect on the adopted value for $w_i$.

In another embodiment of the method according to the present invention, if a subsequent comparison yields that said first counter is below a first lower bound, e.g. zero, or that said second counter is below a second lower bound, e.g. zero, said first counter or said second counter, respectively, is reset to an initial value thereof. This makes sure that said first and second counters are lower-bounded.

In yet another embodiment of the method according to the present invention, if both said first counter and said second counter have their respective initial values, then at least $w_i$ is set to a default value, preferably $w_i$ being equal to unity. This defines normal operating conditions of the actuator system.

In another embodiment of the method according to the present invention, if $u_p$ is close to its physical bounds (e.g., maximum thrust and torques are commanded) or too many actuators are in saturation (e.g. $u_i > u_{avail}$, for i={1,2, ... h} and h<k), then re-weighting functions can be ignored or thresholds ($\bar{t}_i^{avail}$, $\bar{t}_i^{max}$) can be reduced. This is because in case of very high physical demand, all motors might be needed at all costs.

It will be evident for the skilled person that all counters defined above can alternatively be operated inversely, i.e., decreased instead of increased, or vice versa.

It will be evident for the skilled person that all mentioned time intervals preferably correspond to a same or common time interval. Furthermore, preferably all counters mentioned above are increased/decreased by a common counter interval, which may correspond to a time step, e.g. within one control loop cycle.

The gist of the invention, in terms of a highly preferred embodiment, can be summed up in stepwise fashion as follows:

1. The weight matrix is adjusted when $f(u_i)$ is greater than $f(u_i^{avail})$ or $f(u_i^{max})$. In that case, relevant counters ($t_i^{avail}$, $t_i^{max}$) start increasing. These counters could also be temperature measurements or the like.

2. A maximum actuator limit known to the controller, $u_i^{max}$, is reduced to $u_i^{avail}$, when those counters (or temperature measurements) hit their own limits ($\bar{t}_i^{avail}$, $\bar{t}_i^{max}$). At this moment, a cool-down counter starts to count down (replicating cool-down phase, meaning that if a temperature measurement is available this can be replaced with temperature, and new logic would be: if actuator is cooled-down enough, i.e., measured temperature<temperature threshold).

3. When the cool-down phase is finished, all the counters and maximum control limits are set to initial values, i.e., nominal condition.

4. Logic repeats.

5. This logic would be used only when rank(D)>d, e.g.; d=4 and $u_p > u_p^{min}$.

BRIEF DESCRIPTION OF THE DRAWINGS

Further features and advantages of the invention will now be described with reference to the appended drawings, which illustrate specific embodiments of the invention.

FIG. 3 shows a possible logic for a computer algorithm performed by the flight control unit of the aircraft in FIG. 1.

DETAILED DESCRIPTION

Figure 1:
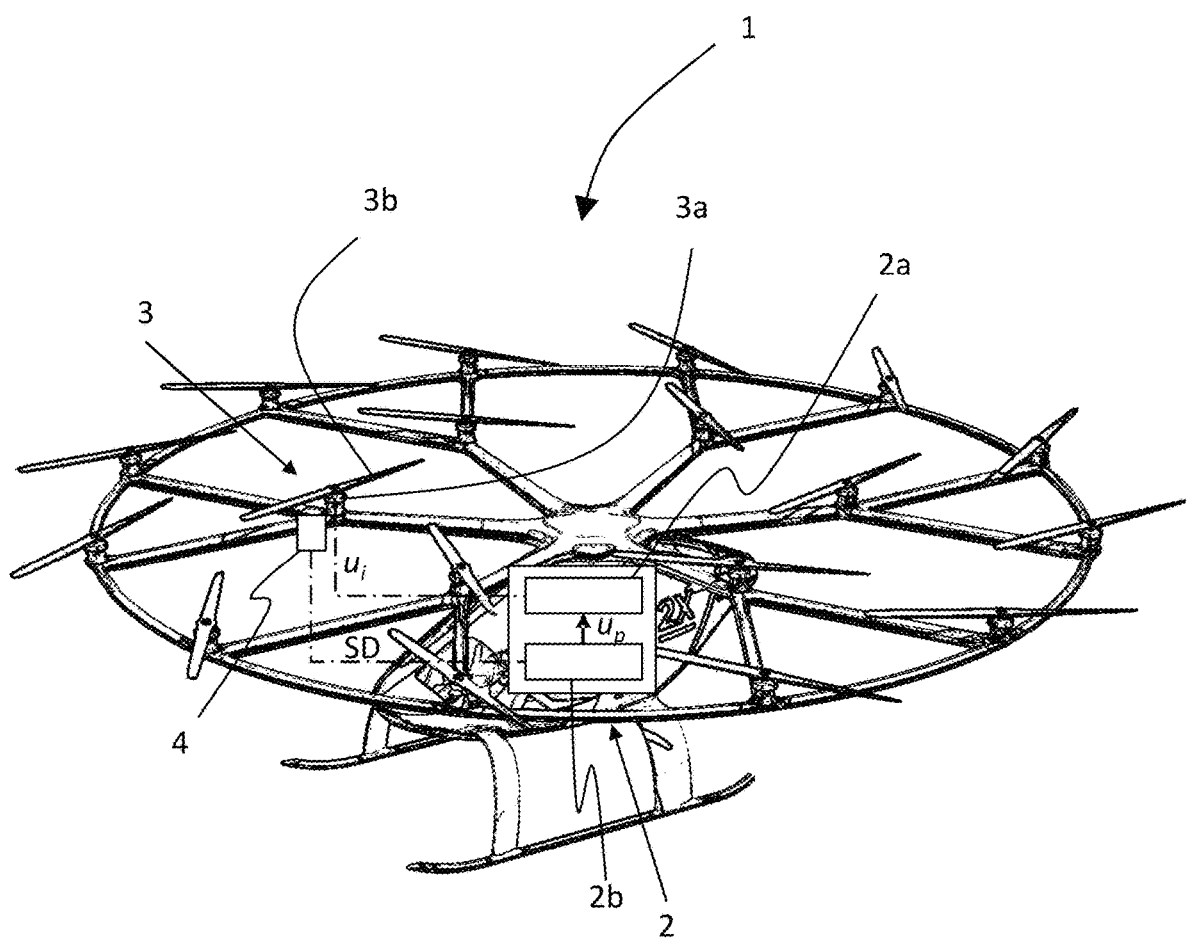
FIG. 1 shows a schematic drawing of an aircraft according to the invention.

FIG. 1 shows an exemplary MAV-eVTOL aircraft denoted by reference numeral 1. Aircraft 1 has a flight control unit 2 which is in operational connection with a plurality of actuators 3 in the form of aircraft propulsion units, each having an electric motor 3a and a propeller 3b. Only one actuator is explicitly marked in FIG. 1 for reason of clarity. According to the example of FIG. 1, in a vicinity of (each) actuator 3 there is located at least one sensor 4 for measuring an operational state of the actuator 3. This may comprise—without limitation—measuring a temperature, an electrical power consumption, a rotational velocity (RPM) etc. of the actuator, in order to determine its present operational state and health status (e.g., overheated). There are many more flight relevant sensors onboard the aircraft 1, which determine flight control and safety-relevant data (attitude, air speed, ground speed, collision-avoidance data etc.) which are known to the skilled person and not shown here. These sensors 4 provide aircraft status data SD which can be used by flight control unit or controller 2. In this way, flight control unit 2—by means of suitable algorithms—using known state feedback control laws (which for MAV-VTOL comprise, e.g., attitude, altitude, position/velocity control, path/trajectory tracking etc.) compute a desired control input $u_p$ based on the system dynamics described in Equation 1. This, however, needs to be distributed to the physical actuators 3 using actual control inputs u. Hence, a sort of inverse matrix computation is needed in order to compute $u_p$ from u. This has been explained in detail before.

Flight control unit 2 comprises an algorithm 2a (i.e., comprises computing means that perform said algorithm 2a) which receives said desired control input $u_p$ and which performs the method according to the present invention (or an embodiment thereof) in order to weight and reshape the actuator allocation. The output of the corresponding calculations is provided to actuator control means 2b, which provide the actual control input $u_i$ to the individual actuators 3. Data from sensors 4 can be used to enhance performance of the algorithm, e.g., by providing control feedback—however, this is not required.

Figure 2:
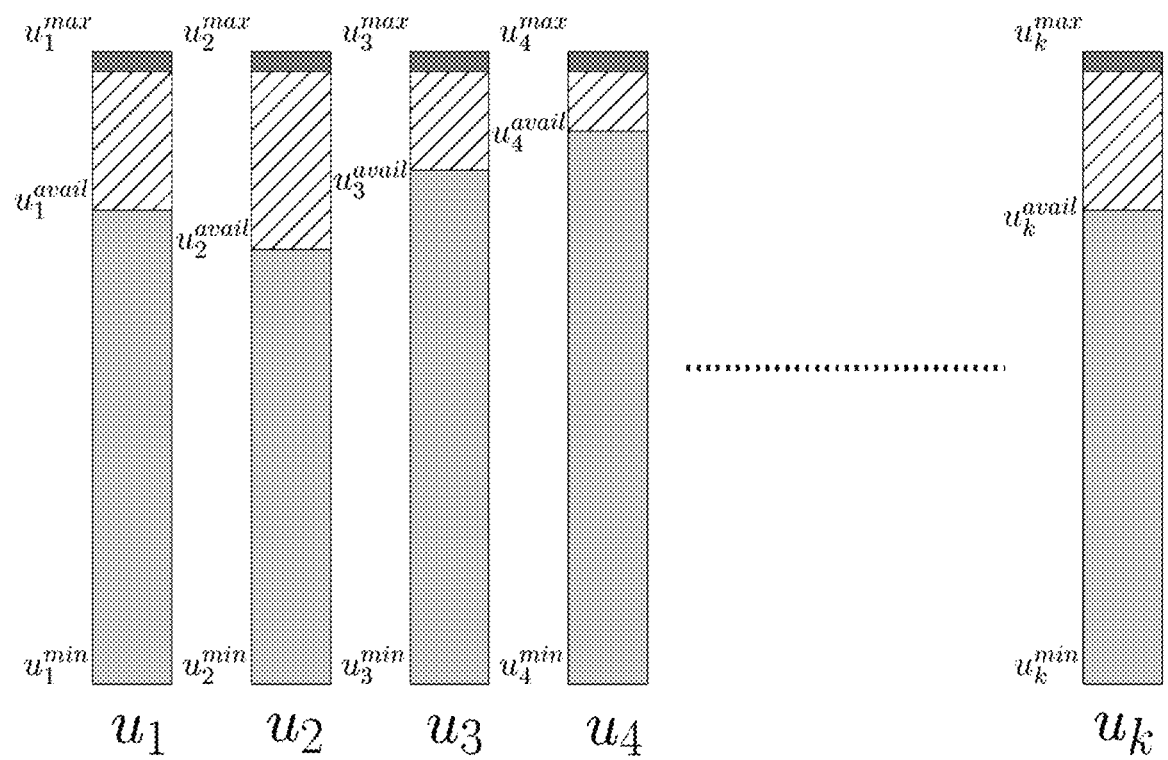
FIG. 2 schematically illustrates control limits $u_i^{min}$, $u_i^{max}$ and $u_i^{avail}$ for each actuator.

FIG. 2 schematically illustrates control limits $u_i^{min}$, $u_i^{max}$ and $u_i^{avail}$ for each actuator. Each of these limits can be different for each actuator (e.g. are not necessarily the same for all actuators). While $u_i^{min}$ denotes a minimum control input for a given actuator which could correspond to the minimum RPM, thrust, torque, power, etc. that said actuator can provide, $u_i^{max}$ could correspond to the maximum RPM, thrust, torque, power, etc. that said actuator can physically provide at peak power and only for a specific amount of time. $u_i^{avail}$ could correspond to the maximum RPM, thrust, torque, power, etc. that actuator can provide continuously, e.g. without overheating/overloading problems. Before, $u_i^{avail}$ had been referred to as a first threshold value in the form of a rather soft limit (available control limit). For typical actuators 3, e.g. electric motors for MAVs, cf. FIG. 1, this limit corresponds to the characteristics or functional mode described before according to which the actuator can provide continuous power for a substantially unlimited time, in particular during one full mission (i.e. between take-off and landing, which is the maximum flight time).

In FIG. 2, $u_i^{avail}$ is different for each of the actuators; $u_i^{min}$, $u_i^{max}$ are the same for each of the actuators, which need not be necessarily so. While the area just above $u_i^{avail}$ is hatched, there is another area just below $u_i^{max}$ which is shown in a darker shade. The lower border of this darker area corresponds to $u_i^{max} - \epsilon_i$, wherein $\epsilon_i$ is a safety margin, as explained before.

FIG. 3 shows a possible logic for a computer algorithm performed by the flight control unit of the aircraft in FIG. 1, which algorithm uses the definitions given before and partly illustrated in FIG. 2. Said algorithm is referred to a weighting and reshaping algorithm for the allocation of the actuator commands, and it is performed by flight control unit 2 (FIG. 1) to provide the aircraft's actuators with control input $u_i$.

The algorithm of FIG. 3 is somewhat self-explanatory so that a short description thereof will be sufficient here. It comprises three procedures INITIALIZE (lines 1-3), REWEIGHTRESHAPEALLOCATION (lines 4-29) and WEIGHTEDALLOCATION (lines 30-31). The procedure INITIALIZE initializes the cool-down timer (or counter) for each actuator (propulsion unit): $t_i^{cd} \leftarrow t_i^{cd,init}$ and the maximum actuator limits: $u_i^{max} \leftarrow u_i^{max,init}$. A possible value for this timer could be 10 s. This timer indicates for how long an actuator will be operated with reduced control limit after having been operated for more than a certain amount of time above $u_i^{avail}$.

The procedure REWEIGHTRESHAPEALLOCATION comprises, in line 7, a comparison, for each one of the actuators, of $f_i(u_i)$ with both $f_i(u_i^{min})$ and $f_i(u_i^{avail})$, the latter being a first threshold. If said first threshold is not exceeded, and the cool-down timer $t_i^{cd}$ still has its initial value, then $w_i$ is set to 1 (unity weight), which is the nominal or default condition: the corresponding actuator is weighted normally. The counters $t_i^{avail}$ and $t_i^{max}$, as defined before, are decreased, and are set to zero in case they should become negative. In line 15, there is another comparison of $f_i(u_i)$ with $f_i(u_i^{avail})$. In case $f_i(u_i) > f_i(u_i^{avail})$, a corresponding further timer is increased, which accounts for the time a given actuator is operated above its available control limit. Then, in line 17, there is another comparison of $f_i(u_i)$ with $f_i(u_i^{max}) - \epsilon_i$, which corresponds to operation at maximum control limit minus a heuristically set safety margin. In case $f_i(u_i) > f_i(u_i^{max}) - \epsilon_i$, a corresponding further timer is increased, which accounts for the time a given actuator is operated at or close to its maximum limit. If, in line 19, both counters $t_i^{avail}$ and $t_i^{max}$ are still zero, we have nominal conditions, and $w_i$ is set to 1 (unity weight). Otherwise it is checked, beginning in line 22, whether or not at least one of counters $t_i^{avail}$ and $t_i^{max}$ has reached its maximum or upper threshold value, which indicates that a given actuator has been operated above the available limit $f_i(u_i^{avail})$ for too long. If said check is positive, the highest possible control limit for that actuator is reduced, $u_i^{max} \leftarrow u_i^{avail}$, which is also referred to as reshaping. In line 25, the corresponding cool-down timer or counter is started (decreased) in order to be able to end the reshaping after a pre-set amount of time. Lines 26 through 30 codify an end of cooldown, if the timer has reached zero. If, however, counter $t_i^{max}$ is not zero, i.e. there has been operation at or close to the physical control limit, but neither $t_i^{avail}$ and $t_i^{max}$ has reached its maximum or threshold value (line 31), then $w_i$ is set to a value derived from a weighting function (wf1, e.g. a sigmoid or sigmoid-like function) with argument $t_i^{max}$, which yields a value for $w_i$ between 0 and 1. And if $t_i^{max}$ is zero but the counter $t_i^{avail}$ is not zero, i.e., there has been operation above the available control limit, but neither $t_i^{avail}$ and $t_i^{max}$ has reached its maximum or threshold value (line 31), then $w_i$ is set to a value derived from another weighting function (wf2, e.g. a sigmoid or a sigmoid-like function) with argument $t_i^{avail}$, which yields a value for $w_i$ between 0 and 1. The two weighting functions wf1 and wf2 may have the same logic.

Figure 4:
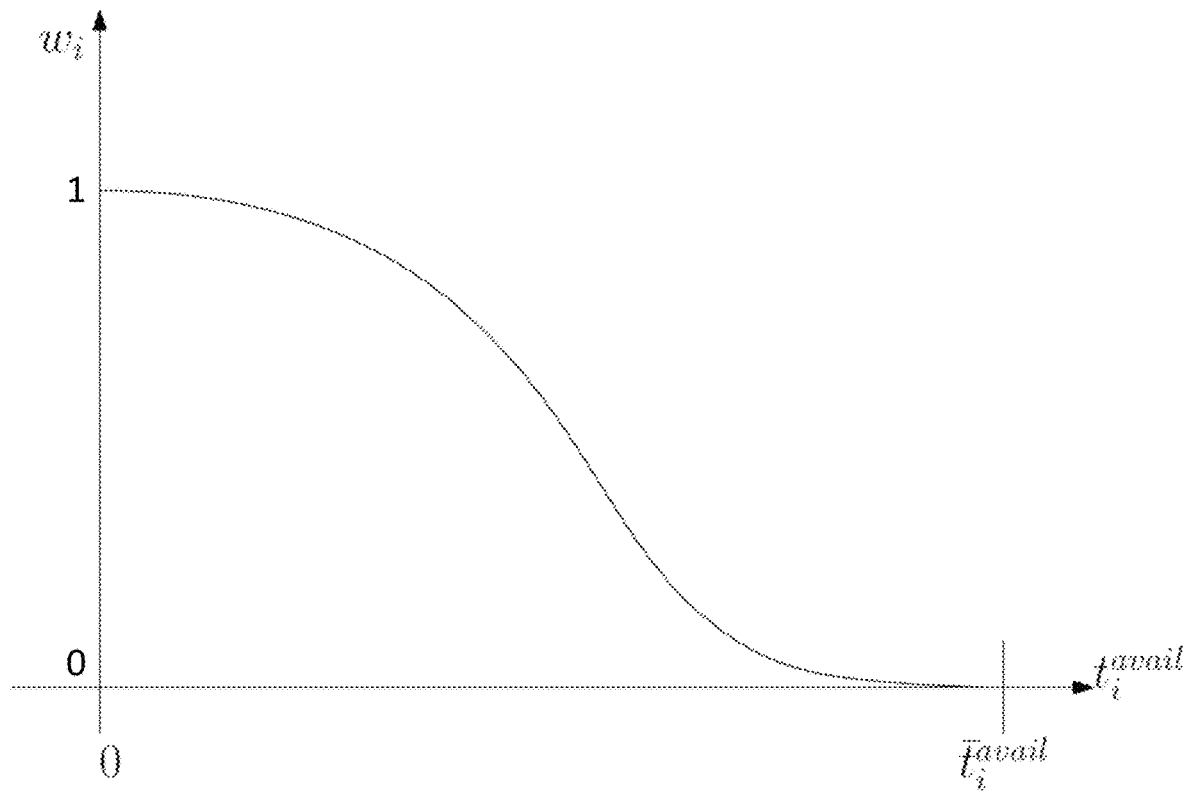
FIG. 4 shows a simple weighting function in the form of a 1-sigmoid function.

FIG. 4 illustrates this in exemplary fashion, wherein $w_i(t_i^{avail}) = 1$ sigmoid$(t_i^{avail}) = 1 - 1/(1 + \exp(-t_i^{avail}))$: $w_i$ takes on values between 0 and 1 for arguments $t_i^{avail}$, ranging from 0 to $\bar{t}_i^{avail}$. While $w_i$ remains close to 1 for small values of $t_i^{avail}$, it then falls off rather steeply around $t_i^{avail} = 0.5 \bar{t}_i^{avail}$ and tends toward zero for even larger values of $t_i^{avail}$. However, the invention is by no means limited to any particular weighting function.

Referring back to FIG. 3, procedure WEIGHTEDALLOCATION then allocates the actuators by providing inverted matrix $D^{-1}$, which comprises the $w_i$ (actuator weights) and $u_i^{max}$ (current maximum actuator control limits). This is done repeatedly during aircraft operation.

The invention claimed is:

1. A method of controlling an actuator system comprising a plurality of k actuators, wherein said actuators are configured as individual propulsion units of a multiactuator aerial vehicle, the method comprising:
   sending, by a controller, a control input $u_i$ to each of said actuators during operation, and each of the actuators receiving the control input $u_i$, wherein index i denotes a particular one of the actuators,
   determining the control input $u_i$ depending on a weight matrix W comprising a weighting factor $w_i$ for each said actuator and depending on at least a physical maximum control limit $u_i^{max}$ for each of the actuators,
   actively changing both said weighting factor $w_i$ and said physical maximum control limit $u_i^{max}$ during operation of the actuator system when a first comparison, for at least some of the actuators, of said control input $u_i$ or a function $f(u_i)$ thereof with a set first threshold value)) $(f_i(u_i^{avail}))$ yields that said control input $u_i$ or said function $f(u_i)$ thereof exceeds said set first threshold value $(f_i(u_i^{avail}))$,
   augmenting a first counter $(t_i^{avail})$ whenever said first comparison yields that said control input $u_i$ or said function $f_i(u_i)$ thereof exceeds said first set threshold value $(f_i(u_i^{avail}))$, and adjusting at least the weight matrix W based on a value of a weighting function (wf1) that is dependent on the current value of said first counter $(t_i^{avail})$;
   repeating said first comparison over time during operation of the actuator system; and
   determining a new control input $u_i$ from both an adjusted weighting factor $w_i$ and an adjusted physical maximum control limit $u_i^{max}$ and applying the new control input $u_i$ to the actuators.

2. The method of claim 1, wherein said control input $u_i$ is determined based on a pseudo control input $u_p$, wherein $u_p = Du$, D being an allocation matrix dependent on at least $u_i$max, wherein determining u includes solving an equation $u = D^{-1}u_p$, $D^{-1}$ being an inverse allocation matrix and defined as $D^{-1}(W, u_{max})$, W being said weight matrix, wherein the inverse allocation matrix $D^{-1}$ is adjusted according to adjusted values of W and $u_i^{max}$; and
   wherein the new control input $u_i$ is determined from the adjusted inverse allocation matrix $D^{-1}$ and applied to the actuators.

3. The method of claim 1, wherein said first threshold value $(f_i(u_i^{avail}))$ comprises an available control limit $(u_i^{avail})$ for each said actuator, said available control limit $(u_i^{avail})$ being a control input at which a given one of the actuators functions continuously without overload.

4. The method of claim 1, further comprising augmenting a second counter $(t_i^{max})$ whenever the first comparison and any successive comparisons yield that said control input $u_i$ or said function $f_i(u_i)$ thereof exceeds said corresponding set threshold value $(f_i(u_i^{max}))$, and adjusting at least the weight matrix W based on a current value of said second counter $(t_i^{max})$.

5. The method of claim 4, wherein the adjusting of at least the weight matrix W based on the current value of said second counter $(t_i^{max})$ is based on a value of a second weighting function (wf2) that is dependent on said current value of said second counter ($t_i^{max}$).

6. The method of claim 4, wherein the weight matrix W is adjusted based on the current value of at least one of the first counter or the second counter, only when at least one of the first counter or said second counter does not exceed its respective set threshold value ($f_i(u_i^{avail})$, $f_i(u_i^{max})$).

7. The method of claim 4, wherein $u_i^{max}$ is adjusted to a lower value, said lower value being an available control input ($u_i^{avail}$) at which a given actuator can function continuously without overload, when said first counter ($t_i^{avail}$) exceeds a set first counter threshold ($\bar{t}_i^{avail}$).

8. The method of claim 1, further comprising:
augmenting a first counter ($t_i^{avail}$) whenever said first comparison yields that said control input $u_i$ or said function $f_i(u_i)$ thereof exceeds said first set threshold value ($f_i(u_i^{avail})$), and adjusting at least the weight matrix W based on a current value of said first counter ($t_i^{avail}$), and
actively changing W and $u_i^{max}$ during operation of the actuator system based on a second comparison, for at least some of the actuators, of the control input $u_i$ or said function $f_i(u_i)$ thereof with at least a second set threshold value ($f_i(u_i^{max})$) for said control input $u_i$ or said function $f_i(u_i)$ thereof, when said second comparison yields that said control input $u_i$ or said function $f_i(u_i)$ thereof exceeds said second set threshold value ($f_i(u_i^{max})$), and when a second counter ($t_{max}$), which second counter ($t_{max}$) is augmented whenever said second comparison yields that said control input $u_i$ or said function $f_i(u_i)$ thereof exceeds said second set threshold value ($f_i(u_i^{max})$) exceeds a set second counter threshold ($\bar{t}_i^{max}$), whereupon $u_i^{max}$ is adjusted to a lower value available control input ($u_i^{avail}$), said lower value available control input ($u_i^{avail}$) being the control input ($u_i^{avail}$) at which a particular one of the actuators functions continuously without overload, said second comparison being repeated over time during operation of the actuator system, wherein said second set threshold value ($f_i(u_i^{max})$) comprises the maximum control limit ($u_i^{max}$) for each said actuator, said maximum control limit ($u_i^{max}$) being the control limit ($u_i^{max}$) at which a particular one of said actuators functions only during a limited amount of time without overload.

9. The method of claim 8, wherein, when either said first counter ($t_i^{avail}$) exceeds a set first counter threshold ($\bar{t}_i^{avail}$) or said second counter ($t_i^{max}$) exceeds said set second counter threshold ($\bar{t}_i^{max}$), a third counter ($t_i^{cd}$) is decreased and the weighting $w_i$ is set to a default value, with $w_i$ being equal to unity and $u_i^{max}$ is set to $u_i^{avail}$, and when said third counter ($t_i^{cd}$) has reached a third set counter threshold, said first, second, and third counters ($t_i^{avail}$, $t_i^{max}$, $t_i^{cd}$) are reset to a respective initial value thereof and also $u_i^{max}$ is set to its initial value $u_i^{max,init}$.

10. The method of claim 9, wherein, based on a third comparison, for at least some of the actuators, of the control input $u_i$ or a function $f_i(u_i)$ thereof with said first set threshold value ($f_i(u_i^{avail})$) and of said third counter ($t_i^{cd}$) with said third set counter threshold, when said third comparison yields that said control input $u_i$ or said function $f_i(u_i)$ thereof does not exceed said first set threshold value ($f_i(u_i^{avail})$) and that said third counter ($t_i^{cd}$) has its initial value ($t_i^{cd,init}$), then at least $w_i$ is set to the default value, with $w_i$ being equal to unity, said third comparison being repeated over time during operation of the actuator system.

11. The method of claim 10, wherein, when said third comparison yields that said control input $u_i$ or said function $f_i(u_i)$ thereof does not exceed said first set threshold value ($f_i(u_i^{avail})$) and that said third counter ($t_i^{cd}$) has its initial value ($t_i^{cd,init}$), at least one of said first counter ($t_i^{avail}$) is decreased or said second counter ($t_i^{max}$) is decreased.

12. The method of claim 11, wherein, when a subsequent comparison yields that said first counter ($t_i^{avail}$) is below a first lower bound or that said second counter ($t_i^{max}$) is below a second lower bound, said first counter ($t_i^{avail}$) or said second counter ($t_i^{max}$), respectively, is reset to its initial value thereof.

13. The method of claim 12, wherein, when both said first counter ($t_i^{avail}$) and said second counter ($t_i^{max}$) have their respective initial values, then at least $w_i$ is set to the default value, with $w_i$ being equal to unity.

14. An aircraft comprising:
an actuator system including a plurality of k actuators, said actuators being configured as individual propulsion units of the aircraft, each of said actuators, during operation, is adapted to receive, from at least one flight control unit, a control input $u_i$, wherein index i denotes a particular one of said actuators, wherein said control input $u_i$ is determined by at least one computer algorithm performed on said at least one flight control unit, the at least one flight control unit by performing said algorithm, is configured to:
determine the control input $u_i$ depending on a weight matrix W comprising a weighting factor $w_i$ for each said actuator and depending on at least a physical maximum control limit $u_i^{max}$ for each of the actuators,
actively change both said weighting factor $w_i$ and said physical maximum control limit $u_i^{max}$ during operation of the actuator system when a first comparison, for at least some of the actuators, of said control input $u_i$ or a function $f(u_i)$ thereof with a set first threshold value)) ($f_i(u_i^{avail})$ yields that said control input $u_i$ or said function $f(u_i)$ thereof exceeds said set first threshold value ($f_i(u_i^{avail})$),
augmenting a first counter ($t_i^{avail}$) whenever said first comparison yields that said control input $u_i$ or said function $f_i(u_i)$ thereof exceeds said first set threshold value ($f_i(u_i^{avail})$), and adjusting at least the weight matrix W based on a value of a weighting function (wf1) that is dependent on the current value of said first counter ($t_i^{avail}$):
repeat said first comparison over time during operation of the actuator system; and
determine a new control input $u_i$ from both an adjusted weighting factor $w_i$ and an adjusted physical maximum control limit $u_i^{max}$ and applying the new control input $u_i$ to the actuators.

15. The aircraft of claim 14, further comprising sensors configured to provide sensor data representative of a physical and operational state of the aircraft, and the least one flight control unit is configured to determine a pseudo control input $u_{pj}$ from said sensor data.

* * * * *